United States Patent [19]
Lauer

[11] Patent Number: 5,528,591
[45] Date of Patent: Jun. 18, 1996

[54] END-TO-END CREDIT-BASED FLOW CONTROL SYSTEM IN A DIGITAL COMMUNICATION NETWORK

[75] Inventor: Hugh C. Lauer, Concord, Mass.

[73] Assignee: Mitsubishi Electric Research Laboratories, Inc., Cambridge, Mass.

[21] Appl. No.: 381,107

[22] Filed: Jan. 31, 1995

[51] Int. Cl.⁶ .......................... H04L 12/56; H04L 29/02
[52] U.S. Cl. ........................................ 370/60.1; 370/94.2
[58] Field of Search .................................. 370/13, 17, 60, 370/60.1, 58.1, 58.2, 58.3, 94.1, 94.2

[56] References Cited

U.S. PATENT DOCUMENTS 5,392,280  2/1995  Zheng ................................ 370/94.2
5,446,734  8/1995  Goldstein ............................ 370/60.1

*Primary Examiner*—Wellington Chin
*Attorney, Agent, or Firm*—Robert K. Tendler

[57] ABSTRACT

An improvement to a system for controlling traffic in a digital communication network eliminates the necessity for separate buffer queues in a credit-based traffic control system by providing switches at intermediate nodes that provide credit numbers back to the source reflecting either credit numbers from downstream nodes or the numbers of buffers allocated to virtual connections at the node, whichever is the smaller. In one embodiment, this is accomplished by dividing the buffers at a node among the number of virtual connections at that node to establish a number of buffers, each allocated to a different virtual connection, and comparing the numbers of credits received at that node with the number of buffers. Thereafter, data cells are transmitted only in accordance with that credit number such that the amount of data transmitted down the virtual channel is limited to that which can be processed at the node with the fewest or most restricted buffers, whereby data may be immediately transmitted to other nodes without loss.

1 Claim, 3 Drawing Sheets

END-TO-END CREDIT-BASED FLOW CONTROL SYSTEM IN A DIGITAL COMMUNICATION NETWORK

FIELD OF THE INVENTION

This invention relates to traffic control in a digital communication network and more particularly to a system for controlling data transmission to minimize data loss while accommodating bursty data traffic.

BACKGROUND OF THE INVENTION

In a transmission of data over a digital communication network, such as an asynchronous transfer mode or ATM network, flows of data from a source of the network, called a source end system, to a destination of the network, called a destination end system, are organized into virtual connections, where each virtual connection represents the flow of data from a specific user or computer program at a specific source end system to another specific user or computer program at another specific destination end system down a virtual channel. The network carries the data of many virtual connections through its links, with switching of data between links occurring at intermediate switch nodes in the network, accomplished by intermediate systems at these nodes. The data of each virtual connection follows a path or channel through the network that is fixed when the virtual connection is initialized.

Problems arise when multiple sources send data cells or packets at widely varying rates through a switch node or link of the network at an aggregated rate which taxes the ability of that switch node or link to handle the data. Congestion occurs at the node of a network when data arrives at the node at a rate exceeding the rate at which the node can process and forward the data to other nodes. The excess data then accumulates in buffer storage at the node, which fills at a rate which is the difference between the arrival rate and the processing and forwarding rate. If the congestion persists for long periods of time, the buffer storage will be filled to maximum capacity and any additional data must be discarded.

In an effort to minimize such data loss, two types of systems have been used at a source to prevent or inhibit excess data from entering the network. One such system is a rate-based system in which the rate at which the data is permitted to enter the network is adjusted via a feedback signal transmitted back to the source reflecting the congestion of the network. This congestion of the network is typically denoted by an explicit forward congestion indication bit or an explicit rate in the form of Resource Management cells fed back to the source. One such rate controlled system is described in an ATM Forum document #94-0735 entitled "Enhanced PRCA (Proportional Rate-Control Algorithm)" authored by Larry Roberts, August 1994. Additional details of this system are described in ATM Forum document #94-0983R1 entitled "Explicit Rate Performance Evaluations" authored by Andrew S. Barnhart, October 1994, and in ATM Forum document #94-1110 entitled "Proposal for Example Pseudocode for the End-System" authored by Andrew W. Barnhart, Nov. 28, 1994.

A competing system for controlling data transmission uses a credit control approach which guarantees lossless transmission of data cells. The credits are generated starting at a destination node to reflect its ability to receive data. This credit is transmitted back to the next upstream node where this credit is interpreted and modified based on this node's ability to receive data. The process continues through each intermediate node back to the source-where the credit at the source reflects all intermediate credits as well as the one from the destination. Typically the credits are numbers reflecting the unused buffer space at each node. The source then interprets the credit as an indication of the amount of data that it can transmit into the network without any data loss due to congestion or buffer overflow. Note that data rate is not controlled, but the number of cells transmitted is controlled. One such credit controlled system is described in an ATM Forum document #94-0632 entitled "Credit-Based FCVC Proposal for ATM Traffic Management, Revision R2" authored by Doug Hunt, Warner Andrews, Jim Scott, Bob Simcoe, Jon Bennett, H. T. Kung, John Howard, Alan Chapman, and Ken Brinkerhoff, July, 1994.

Each scheme has its advantages and disadvantages. The rate-based scheme relies on systems at either end of the network to do traffic control. Thus very little intelligence and participation are required on the part of switch nodes of ATM networks. Also, the rate-based paradigm is in accordance with the current standards for ATM traffic management to be implemented on network interface hardware. However, the issues of performance and its ability to react to congestion have been raised about the rate-based scheme. There is no analytical proof or real world experience showing that the rate-based scheme will be able to provide satisfactory performance and minimize cell losses of bursty traffic. Furthermore, achieving nearly lossless transmission in a practical network depends on the particular characteristics of the data flows of the virtual connections being carried by that network.

The credit-based scheme, on the other hand, has a solid proof that lossless transmission can be achieved. With its static buffer allocation algorithm, it can also achieve the maximum link bandwidth utilization. However, the credit-based scheme requires coordination and active participation of all switches and intermediate systems in the path of a data flow being controlled. Furthermore, in the prior art, credit-based schemes have been applied on a link-by-link or hop-by-hop basis, thus requiring intermediate systems to be able to reduce, inhibit, or otherwise control the flow of data already sent by the source of one virtual connection while letting the flows of other virtual connections proceed.

This requirement imposes a cost and complexity on switches and intermediate systems greatly in excess of those in networks with rate-based flow control. More specifically, each such switch or intermediate system must include means for maintaining a queue of data cells for each virtual connection so that the cells of any virtual connection can be transmitted by this switch or intermediate system independently of those of other virtual connections. Such means are not required at switches and intermediate systems in networks with rate-based flow control because the rate-based method causes the source of each connection to control the flow of data of its connection at the point where the data enters the network. Thus, in rate-based networks, cells arriving at an intermediate system from many different sources representing many different virtual connections may be combined into one or more queues without reference to the connections to which they each belong. This represents a great savings in the cost and complexity of the switches and intermediate systems.

A combined scheme incorporating credit-based flow control and rate-based flow control has been described in U.S. patent application Ser. No. 08/271,418 entitled "Credit/Rate Based System for Controlling Traffic in a Digital Communication Network" by Qin Zheng, Hugh C. Lauer, and John H. Howard, filed Jul. 6, 1994, incorporated herein by reference, and assigned to the assignee hereof. Another such combined system is described in U.S. patent application Ser. No. 08/297,270 entitled "Credit Enhanced Proportional Rate Control System" by Qin Zheng, filed Aug. 17, 1994, incorporated herein by referenced and assigned to the assignee hereof. However, these schemes also include the requirement of separate queues of buffers for each virtual connection to enable an intermediate system at a switch node to reduce or inhibit the flow of data already sent by one virtual connection while continuing to allow the flows of other virtual connections to proceed. Because of the queueing requirement for each virtual connection at each switch, these systems are subject to levels of cost and complexity similar to credit-only systems.

By way of further background, note that end-to-end flow control systems are widely known in digital communications networks. For example, end-to-end and hop-by-hop flow control techniques are compared by John D. Spragins, Joseph L. Hammond, and Krzysztof Pawlikowski in a book entitled "Telecommunications: Protocols and Design," published by Addision-Wesley, 1991, pages 407–410. The window-based flow control method of the widely used protocol TCP/IP is described by Douglas E. Comer and David L. Stevens in a book entitled "Internetworking with TCP/IP," published by Prentice Hall in 1991. End-to-end flow control techniques in ATM networks are described in "Asyn-chronous Transfer Mode Networks: Performance Issues" authored by Raif O. Onvural and published by Artech House, 1994.

SUMMARY OF INVENTION

In order to achieve the benefit of lossless transmission inherent in credit-based networks while achieving the lower cost and complexity of switches and intermediate systems inherent in rate-based networks, a system for updating credits is provided at each switch and corresponding intermediate system which does not require separate queues for separate virtual connections at the switch. Specifically, a system for controlling traffic in a digital communication network to avoid data loss due to congestion utilizes a credit-based traffic control approach or a combined rate-based and credit based traffic control approach, and adjusts the rate at which data is transmitted from a source in accordance with feedback in the form of credit or rate and credit adjustment information from a network. In the Subject Invention, this feedback information reflects the ability of all downstream nodes of the network to receive data without loss, as opposed to the ability of just the next immediate downstream node in a link-by-link or hop-by-hop approach to credit-based flow control.

Note that in general, the source of data for the network sends out resource management cells composed of various fields containing rate and credit information. Means are provided at the destination and intermediate nodes of the network to update the corresponding fields according to their congestion status and to send the resource management cells back to the source so that the source controls the data transmission accordingly. Because the control is applied at the source, intermediate nodes are not required to further inhibit the flow of data sent by a source. Thus, while data is still required to be queued at each switch, it is not necessary to queue it separately for each virtual connection. This saves as much as a factor of ten in complexity of the switch.

In a preferred embodiment, a source end system periodically sends out resource management cells or RM cells on a virtual connection, such RM cells being composed of various fields containing rate and credit information for that virtual connection. These RM cells follow the same path as the data cells of the virtual connection in the downstream direction, that is from the source end system to the destination end system. The destination end system detects each RM cell as it arrives, updates the rate and credit information in the corresponding fields to reflect is ability to receive data, and then sends the RM cell back to the source in the upstream direction via the same path. At each switch, intermediate systems of the network update the fields of the RM cells flowing in the upstream direction according to their congestion status and continue to send these RM cells further upstream, where they eventually reach the source end system. The source end system then uses the feedback information to control the data transmission accordingly. Specifically, each switch and associated intermediate system may reduce the number in the credit field of an RM cell to indicate how many cells the source end system may transmit before overloading the switch or intermediate system. The source end system then transmits only as much data or only as many cells as specified by the numbers in these credit fields, thereby guaranteeing that no switch or intermediate system will have to discard data due to overload or congestion.

A main feature of the Subject System is that any intermediate switch node in the network includes means to reduce the credit number specified in an RM cell to convey congestion information back to a source end system, but without requiring the switch and associated intermediate system to reduce or inhibit the flow of data itself. This means that no switch need employ separate queues for the separate virtual channels. Thus a source end system can make the use of this feedback information to limit and control cell transmission so that it will not overload the most congested switch or intermediate system its path. Because a switch and its associated intermediate system can only reduce the credits in an RM cell from the destination end system or from an intermediate system farther downstream in the path of a virtual connection, it can freely transmit all cells of that virtual connection without overloading downstream systems.

In this way, the Subject System can achieve the effect of lossless transmission inherent in a credit-based system without the complexity and cost of separate queues for each virtual connection. How the Subject System achieves this without the use of separate queues for each virtual connection at each switch or intermediate node is as follows.

Feedback information is encoded in credit or RM cells regarding the ability of the destination node of each virtual connection to receive data without loss due to buffer overflow. These credit or RM cells carry credit numbers which are then transmitted upstream toward the source. At each intermediate node, the credit number may be reduced, indicating that the intermediate node has a more restricted ability to receive data without loss than does the destination node or any other intermediate node downstream. When the credit or RM cells arrive back at the source node, the resulting credit number indicates the ability of the most restricted intermediate system to receive data without loss. The source end system then limits its transmission of data to no more than the amount of data indicated by the credit number. When this data arrives at the most restricted intermediate node, it can be freely transmitted downstream because the destination end system and all other downstream nodes are not as restricted.

Therefore, the intermediate system in question does not need any means for holding back cells of a virtual connection, pending the receipt of additional credits from downstream. This means that separate queues for each virtual connection are eliminated. That is, the system may schedule the transmission of data from more than one virtual connection without reference to the availability or lack of credits from downstream, since the source would not have sent data if some downstream node were not able to receive it. For this reason, separate queues are not needed at the switches to keep the data of one virtual connection apart from the data of other virtual connections.

BRIEF DESCRIPTION OF DRAWINGS

These and other features of the Subject Invention will be better understood in conjunction with the Detailed Description taken in accordance with the Drawings of which.

DETAILED DESCRIPTION

Figure 1:
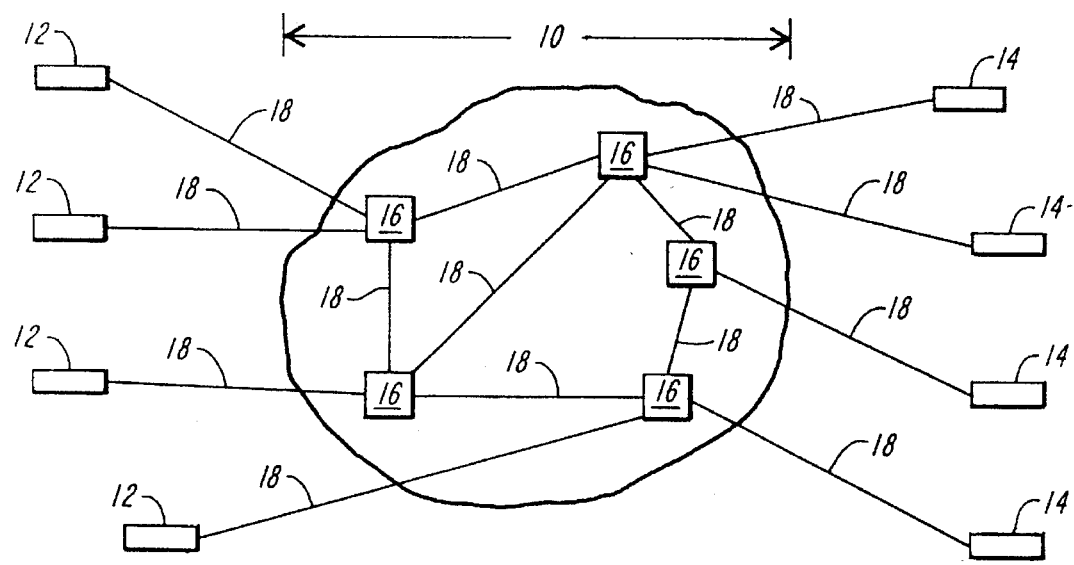
FIG. 1 is a schematic diagram illustrating a network having one or more source end systems connected to one or more destination end systems via intermediate systems and network links.

Referring now to FIG. 1, network 10 couples source end systems 12 to destination end systems 14 by means of intermediate systems 16, also called switches, and network links 18. In this way, any source end system can be coupled to any destination end system, so long as there is a path of links 18 and switches 16 from the one to the other.

Figure 2:
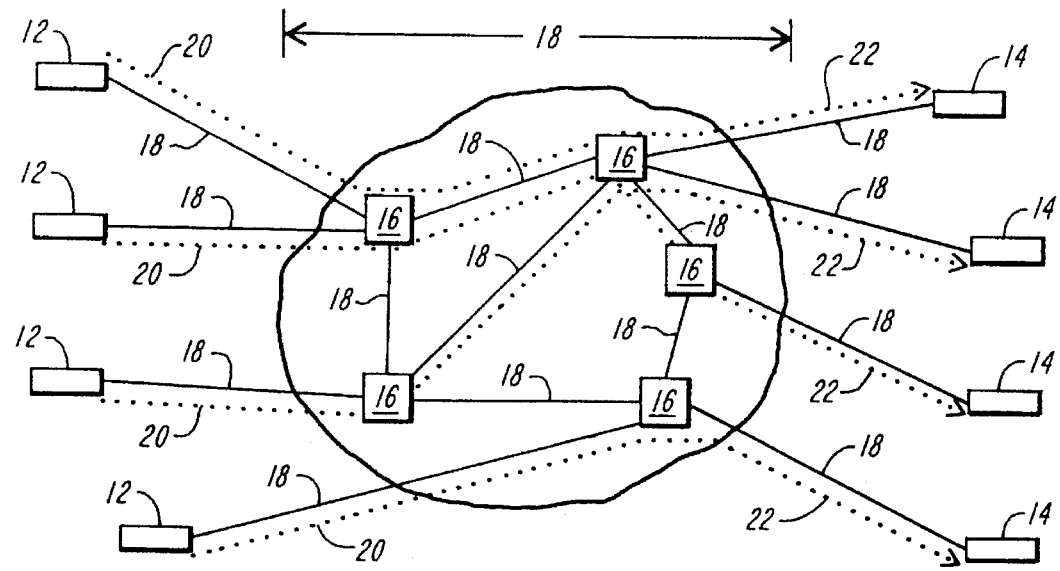
FIG. 2 is a schematic diagram illustrating virtual connections between source end systems and destination end systems of FIG. 1 and further illustrating the flow of data in the downstream direction of each virtual connection and the flow of RM cells in the upstream direction of each virtual connection.

FIG. 2 illustrates virtual connections 20 superimposed on the network of FIG. 1. Each virtual connection is a logical flow of data from one source end system 12 to one destination end system 14, following one or more links 18 and passing through one or more intermediate systems 16. The downstream direction of each connection is indicated by the arrows 22. It will be appreciated that in networks of modern digital computers and other electronic devices, the computer or device representing the source end system of one virtual connection will typically also represent the destination end system of one or more other virtual connections. It will also be appreciated that virtual connections are independent, so that the rate at which one source end system communicates with one destination end system over one virtual connection is separate from and not dependent on the rate at which other source end systems communicate with other destination end systems over other virtual connections.

It will be noticed that more than one virtual connection 20 may pass through the same switch and the same link. In other words, the switches 16 and links 18 may be shared among more than one virtual connection. In such cases, data packets or cells of different virtual connections are interleaved as they flow across the shared links, such interleaving being under the control of the shared switches. Therefore, each network switch includes means for combining the packets or cells of many virtual connections at one end of a shared link and means for separating the packets or cells into their constituent virtual connections at the other end of a shared link.

Figure 3:
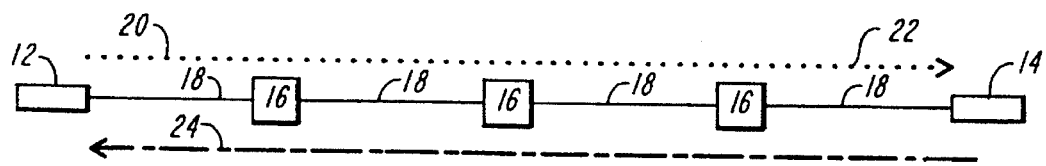
FIG. 3 is an illustration of one virtual connection passing through several intermediate systems and showing the flow of data cells in the forward direction and the flow of the credit or RM cells in the backward direction.

FIG. 3 illustrates a single virtual connection from one source end system 12, passing through one or more intermediate systems or switches 16 and over two or more links 18 before reaching the destination end system 14. Data and control information flow in the forward or downstream direction indicated by arrow 22, while feedback information flows in the backward or upstream direction indicated by arrow 24, the primary purpose of such feedback information being to allow the source end system 12 and any intermediate system 16 to control the flow of data in the forward direction.

Figure 4:
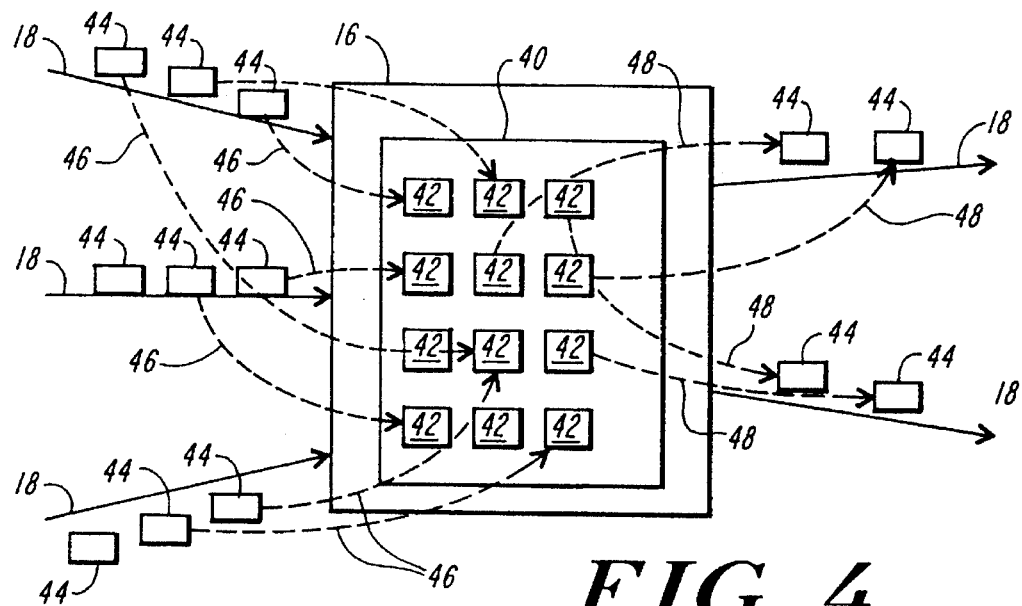
FIG. 4 is a block diagram showing an intermediate system or switch and its buffer storage unit, also showing the flow of data cells into and out of the buffer storage unit.

FIG. 4 illustrates an intermediate system or switch 16, showing a buffer storage unit 40 comprising packet or cell buffers 42. A cell buffer 42 containing no data packet or cell of any virtual connection is called an empty buffer. When a data packet or cell of a virtual connection arrives at the switch via a link 18, it is stored in empty buffer 42 determined by the switch. At a later time determined by the switch, the data packet or cell is transmitted or forwarded over the next link of its virtual connection to the next switch or to the destination end system, and the packet or cell buffer in which it had been previously stored becomes empty again. This is illustrated by the data packets or cells 44, which arrive from the direction indicated by the arrows 46, are then stored in the buffer cells indicated, and are eventually forwarded in the directions indicated by the arrows 48. In general, data packets or cells within one virtual connection are transmitted in order, but the order of transmission may be rearranged among different virtual connections.

Congestion occurs when data packets or cells of one or more virtual connections arrive at a switch over one or more links 18 at a rate exceeding the rate at which that switch can transmit them to the next links of their respective virtual connections. If this excess of the rate of arrival over the rate of transmission persists for a sufficiently long time, all empty packet or cells buffers will be come full, and the buffer storage unit 40 will become overloaded. Thus, subsequently arriving packets or data cells must be discarded, there being no more empty buffers in which to store them, thus causing their respective virtual connections to lose data. To prevent such loss of data, the switch must send feedback information upstream to the intermediate systems and/or source end systems of one or more of the virtual connections in a timely manner to cause those intermediate systems and/or source end systems to reduce the rates of or transmission of data on their respective virtual connections, or to stop transmission altogether, before the number of empty packet or cell buffers becomes exhausted.

Figure 5:
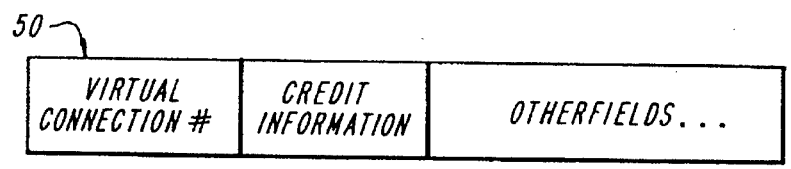
FIG. 5 is a diagram of an embodiment of an RM cell with credit information for controlling the flow of data of a virtual connection.

In credit-based flow control systems, such information is encoded as a credit number in a field of a resource management or RM cell or in a credit cell. FIG. 5 illustrates one embodiment of an RM cell 50, including a virtual connection identifier field 52 and credit field 54 containing a number from which a source end system 12 or an intermediate system 16 may derive the maximum number of cells that may be sent before causing overload of the buffer storage unit 42.

Each switch 16 divides the total number of buffers in its buffer storage unit 42 to determine the credit field 50 for each virtual connection. Then it sends that information upstream to its immediate upstream neighbor of that virtual connection, that is either to a switch 16 or to the source end system 12 if there is no other switch upstream of the switch sending the information. Likewise, a destination end system 16 determines a credit field to indicate how many data packets or cells it can receive and process at any given time, then forwards that information to its immediate upstream neighbor.

When a switch 16 or source end system 12 receives credit information from its immediate downstream neighbor of a virtual connection, it uses that information to determine the number of data packets or cells of that virtual connection that may be transmitted in the downstream direction without loss due to overflow of the buffer storage unit of that downstream neighbor. This number so derived is called the number of credits. The switch receiving a certain number of credits may transmit no more than that number of data packets or cells, and therefore it must store any additional cells that arrive on that virtual connection in its buffer storage unit until such later time as it receives additional credits.

Figure 6:
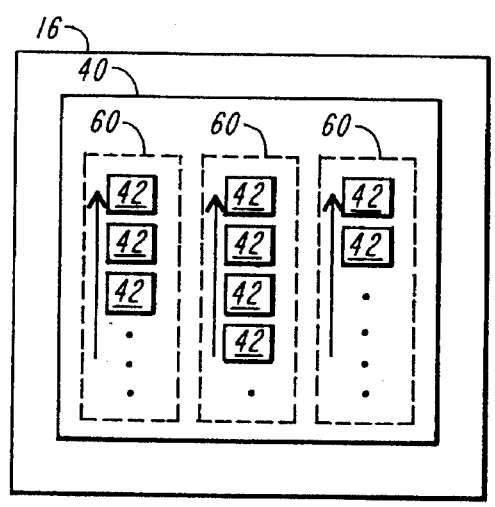
FIG. 6 is a block diagram illustrating prior art separate queues of buffers in the buffer storage unit, there being one queue for each separate virtual connection.

Because virtual connections are, in general, independent of each other, credits for different virtual connections may arrive from their respective downstream neighbors at different rates. Therefore, in the prior art, it is necessary for a switch to maintain a set of queues or other means for organizing the set of packet or cell buffers so that data packets or cells of one or more virtual connections can be transmitted in the forward direction while data packets or cells of other virtual connections are not being transmitted for lack of sufficient numbers of credits. FIG. 6 illustrates a typical embodiment of such a set of queues in the prior art. Packet or cell buffers 42 in buffer storage unit 40 are organized in queues 60, such that each arriving data packet or cell is stored at the end or bottom of the a queue for its virtual connection, and each cell or packet to be transmitted for the virtual connection is taken from the front or top of the same queue. Because the number of virtual connections in any switch or intermediate system may be large, numbering in the thousands or more, the cost of embodiments of this number of queues or other means in electronic circuitry is considered to be excessive, while the speed of embodiments in computer programs is considered inadequate for ATM networks with transmission rates of 100 megabits per second or more.

In the Subject System, no such set of queues or other means is required to organize the packet or cell buffers so that the data of some virtual connections may be transmitted while the data of others must not be transmitted. Instead, when a credit or RM cell arrives at a switch from the immediate downstream neighbor, this switch determines how many packets or cell buffers it can allot to that virtual connection. It then replaces the credit field of the credit or RM cell with a credit number representing either the number of cells it can allot to the virtual connection or the credit number represented by the credit field from the downstream neighbor, whichever is less. In other words, the credit field of a credit or RM cell represents the smallest number of buffers allotted to the virtual connection at any point between its source end system and its destination end system. By this means, the source end system will not transmit more data packets or cells than can be accommodated by the switch with the most congested or most restricted buffer storage unit. Therefore, a switch or intermediate system is not required to further inhibit or reduce the flow of data packets or cells already transmitted from the source end system, because the source will not have transmitted any more cells than can be handled by every downstream system. As a result, no separate queue or other means for inhibiting or reducing the rate of transmission of an individual virtual connection is required.

Figure 7:
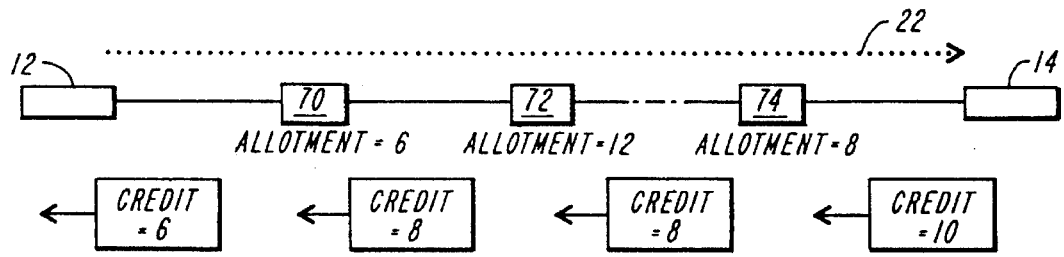
FIG. 7 is a schematic diagram illustrating the flow of data of a virtual connection in the downstream direction and the flow of credit cells in the upstream direction, also illustrating the reduction of credits by intermediate systems to reflect the ability to process and forward data cells.

FIG. 7 illustrates an example of the system of FIG. 3, showing a virtual connection with a source end system 12, three intermediate systems or switches 70, 72, and 74, and a destination end system 14. Data flows in the forward direction, as indicated by arrow 22. The destination end system 14 allots ten buffers, as represented by a credit number of ten in credit cell 76, and transmits this credit cell in the upstream direction as indicated by the arrow attached to credit cell 76. Switch 74 receives this credit cell, but determines that it can allot only eight packet or cell buffers to the virtual connection. Accordingly, switch 74 reduces the credit number from ten to eight, and then transmits this information in credit cell 77 to switch 72. Switch 72 determines that it can allot twelve buffers to the virtual connection. Since this is greater than the number of credits represented by credit cell 77, switch 72 transmits credit number eight unchanged in credit cell 78. Finally, switch 70 determines that it can only allot six packet or cell buffers to the virtual connection, and thus reduces the number of credits from eight to six. The source end system 12 may then transmit six data packets or cells without overflowing switch 70 or any other switch in the path of its virtual connection.

Figure 8:
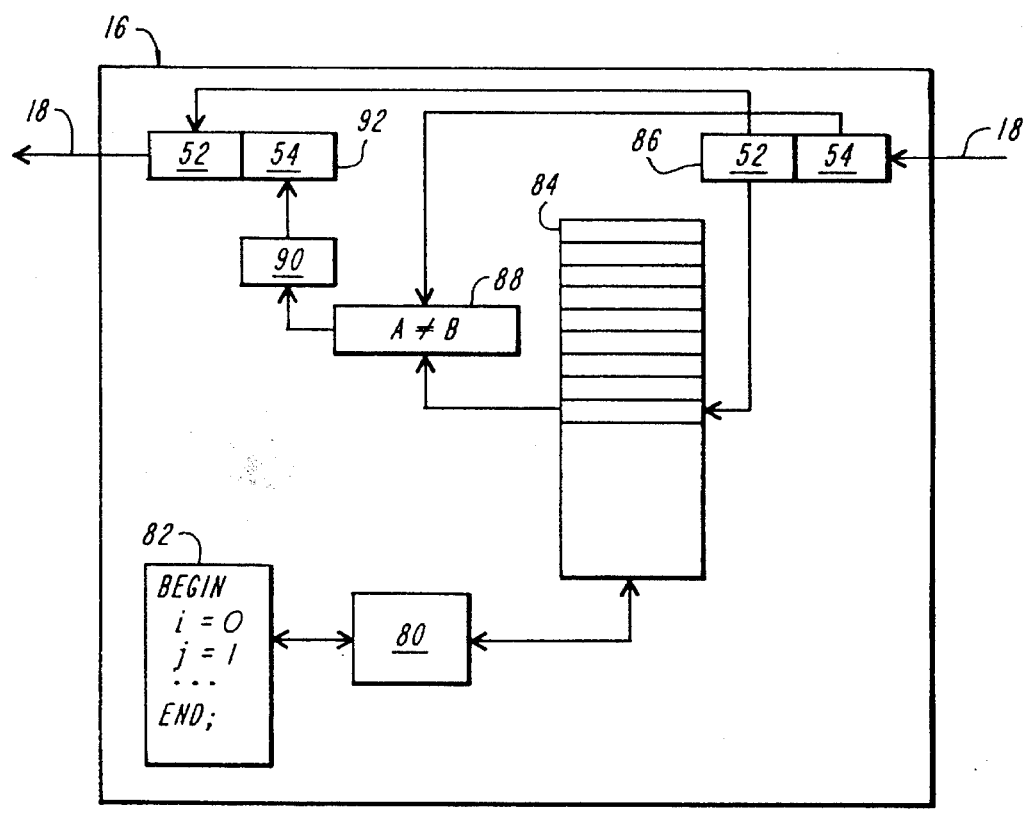
FIG. 8 is a block diagram of a system for reducing credits in upstream credit cells.

Referring now to FIG. 8, in one embodiment, the division of the total number of buffers in intermediate system 16 is determined periodically by a microprocessor 80 containing computer program 82. The result of the division is stored in a set of electronic registers 84, one register representing each virtual connection. A credit or RM cell receiver unit 86 receives a credit or RM cell from link 18 and decodes the virtual connection indicator field 52 and credit field 54. The virtual connection indicator 52 is applied to the register file 84 to couple the previously computed number of buffer packets or cells allotted to the virtual connection to a comparator circuit 88. Credit field 54 is also coupled to comparator circuit 88 to determine a new credit number 90, it being the lesser of the two numbers coupled thereto. This new credit number 90 is then applied to a credit or RM cell transmitter 92, along with virtual connection indicator 52, to create a credit or RM cell for transmission to the immediate upstream neighbor.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A system for controlling traffic in a digital communication network utilizing a credit-based flow control system in which credit information is transmitted from a destination to a source through intermediate nodes via virtual connections at said nodes, comprising:

a switch at one of said intermediate nodes of said network, said switch having a number of cell buffers and accommodating a plurality of said virtual connections;

means for dividing the total number of cell buffers in said switch into a number of cell buffers each associated with a different one of said virtual connections to provide a quotient:

means at said switch for receiving credit cells from a downstream node, each of said credit cells having a credit number associated therewith, said means at said switch for receiving credit cells from a downstream node including means for decoding said credit number to provide a decoded credit number;

means at said switch for comparing said decoded credit number with the number of cell buffers resulting from said quotient; and means for transmitting to an upstream node a credit number comprising either said credit number or said quotient reflecting the number of cell buffers resulting from said division, whichever is smaller.

* * * * *